ARC BLOW-OUT DEVICES IN CURRENT-BREAKING APPARATUS
Filed Aug. 18, 1965 3 Sheets-Sheet 1
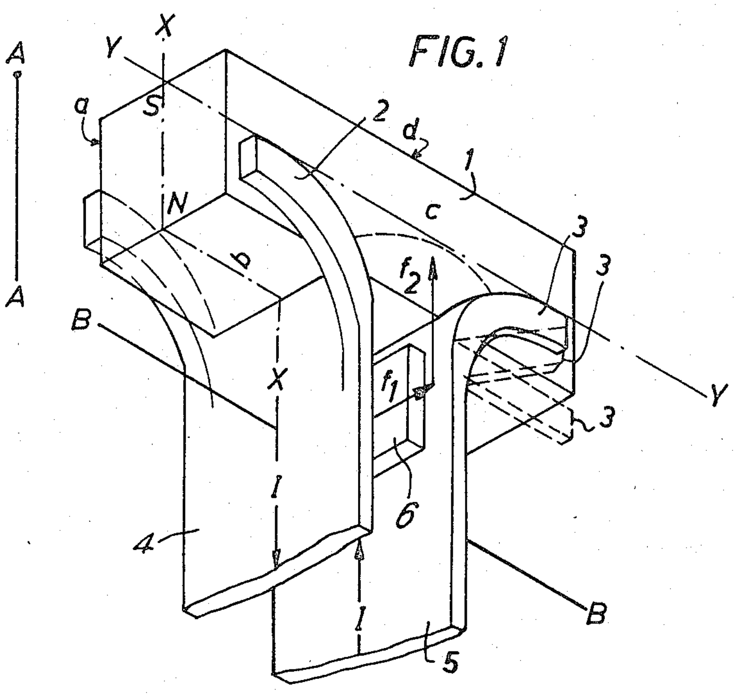
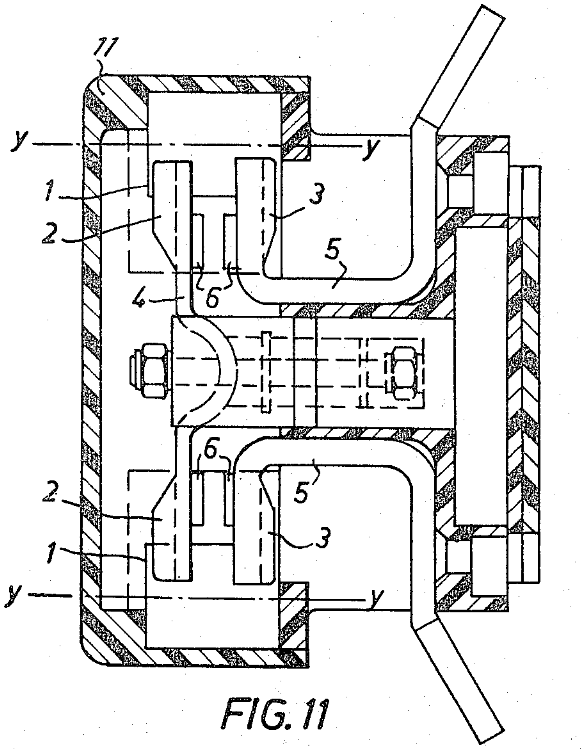
FIG. 11
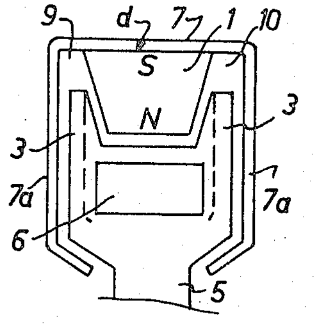
FIG. 6
Inventors
Jules Bazi
Louis Joseph Pechant
By
Karl W. Flocks
Attorney

ARC BLOW-OUT DEVICES IN CURRENT-BREAKING APPARATUS

Filed Aug. 18, 1965

3 Sheets-Sheet 2

Inventors
Jules Bazi
Louis Joseph Fechant
By
KARL W. FLOCKS
Attorney

ARC BLOW-OUT DEVICES IN CURRENT-BREAKING APPARATUS

Filed Aug. 18, 1965

3 Sheets-Sheet 3

Inventors
Jules Bazi
Louis Joseph Fechant
By
KARL W. FLOCKS
Attorney

United States Patent Office 3,376,401
Patented Apr. 2, 1968

3,376,401

ARC BLOW-OUT DEVICES IN CURRENT-BREAKING APPARATUS

Jules Bazi, Rueil-Malmaison, and Louis Joseph Fechant, Le Vesinet, France, assignors to La Telemecanique Electrique, Nanterre, Seine, France, a joint-stock company of France Filed Aug. 18, 1965, Ser. No. 480,641
Claims priority, application France, Aug. 24, 1964, 986,628
9 Claims. (Cl. 200—147)

The development of magnetic material creating fields of high intensity and having a large coercive field has permitted improvements to be made in current-breaking apparatus. For example, it is known that currents of low intensity, having only a weak field of their own, are difficult to break. Large numbers of apparatus have been provided with permanent magnets located close to the break chamber in order to prevent the arc from becoming stationary on the contact members of noble metals, and to cause its elongation, its cooling and its extinction. Certain constructions consist of placing a permanent magnet in isolating chambers, of ceramic material for example, alongside the contact members—one pole face being parallel to the direction of opening of the contacts—so that this magnet can produce in the breaking zone, a blow-out field directed transversely to the direction of opening of the contacts. The result is that, if the apparatus only possesses a single blow-out chamber, it cannot be utilized on alternating current; on direct current it will be polarized. In addition, in order to prevent excessive phenomena and voltage surges during the break, recourse is had to various additional means, such as ceramic or metallic fins in the casing, arrester magnets or windings.

The design of current switches having two blow-out chambers constituted a considerable improvement in breaker apparatus employing permanent magnets. This arrangement makes the switch independent of the direction of the current and thus eliminates polarization.

In one construction of this type, the magnetic flux supplied by permanent magnets is channelled by three magnetic parallel cheeks which form the two adjoining blow-out chambers. When the North poles of the permanent magnets are for example located on the central cheek and the South pole on the outer cheeks, there are obtained in the lower chambers fields having the same direction, perpendicular to the plane of symmetry of the chambers but of opposite direction; in the contact zone, the lines of magnetic force diverge transversely with respect to the direction of opening of the contacts.

With this type of apparatus, it should be observed that:

The use of magnetic sheets of high permeability to channel the fields results in a secondary effect, known as the "image effect" of the arc, which is attracted by the sheets and tends to become immobilized on them, which hinders its subsequent movement. This effect can be reduced by placing isolators in the arc chamber; these must however be thin and must withstand the high temperatures of the arc, which makes the construction of the casings difficult;

It is essential to arrest the arc as it develops. This blocking is achieved by the use of a known technique, giving the magnetic cheeks for channelling the field a surface area smaller than that of the extinction casing of insulating materials.

This arrangement very substantially reduces the field of the magnets but it does not however prevent the arc from developing under the influence of its own field, in the case of very large currents.

It is known to provide a magnet above the contact zone with the direction of magnetization perpendicular to the said zone but in which the width of the magnet is voluntarily small. The magnet is a small bar the axis of which is coincident with the direction of magnetization and is perpendicular to the break zone. Its effect is, moreover, voluntarily limited by a sheet metal member.

The magnet causes low intensity arcs to move; if the intensity remains low, the arc is rapidly extinguished due to the cooling effect produced by the movement and by the contact with the walls; if the intensity increases, the field of a blow-out coil comes into play and rapidly becomes preponderant.

Finally, if the arc is not extinguished, it is stopped by baffles provided in a ceramic casing.

The device according to the invention has for its object to provide a switch with single or double break, of simple construction, non-polarized, with two symmetrical break chambers which, by means of a new arrangement of a permanent magnet (with a large coercive field and a small magnetic permeability) with respect to the fixed and moving contacts, having an appropriate and adjustable shape:

(1) Provides a blow-out field independent of the current broken, which produces, irrespective of the intensity of the current, a rapid movement of the arc away from the zone of the contacts and thus prevents them from being damaged, allows it to become extended, and guides it—depending on its direction—towards one or the other of the two lateral extinction chambers of insulating material, the feet of the arc following the trajectory; piece of noble metal, fixed and moving contact supports opposite the latter, and then the blow-out horns.

When the intensity of the current broken is high, the magnetic field of the current itself reaches values equal to or even greater than that supplied by the magnet. As the two fields are substantially at right angles, the resultant force is then such that the arc, during its movement, can encounter the pole face of the magnet. The devices according to the invention which have to break currents of this type, have a special shape of the magnet so as to prevent immobilization of the arc;

(2) Provides a magnetic field in which the lines of force diverge transversely at the level of the contacts and then become substantially parallel to the plane of symmetry of the magnet and have the same direction in the blow-out chambers, this form of the lines of force and of the equi-potential lines at right angles along which the arc is displaced, bring the latter to be automatically locked in the vicinity of the central plane of the magnet, this zone being the sole position of stable equilibrium of the arc;

(3) By varying the angle of the horns of the fixed and moving contact supports, and/or the height of the magnet, that is, in effect, the distance between the contacts and the neutral line of the magnet enables the length of the developed arc to be regulated to the optimum length considered useful, depending on the current to be broken and the permissible re-establishment voltage, the arrangement of the field compelling it to take-up—as indicated above—a predetermined position of equilibrium;

(4) Eliminates all image effect, the magnet being of a magnetic material having low magnetic permeability;

(5) Eliminates the blow-out coil, which is an incomplete, cumbersome and costly solution;

(6) Locks the arc at the desired length without the necessity of complex baffle devices;

(7) By means of non-magnetic fins disposed in an insulating casing, permits the arc to be cooled and the voltage of the arc to be increased by dividing it up;

(8) In the case in which a magnetic U and non-magnetic internal fins are provided, enables the image effect to be added to the field of the magnet thus contributing to the elongation and splitting-up of the arc in the casing thus formed.

In accordance with the invention, in order to obtain the advantages specified above, a current switch is characterized in that a magnetic mass having a North pole and a South pole and a plane of symmetry coincident with the longitudinal plane of symmetry of the fixed and moving contact supports—the direction of magnetization being parallel to the said plane—is placed in such manner that one of the poles is located facing the fixed and moving contacts, while the fixed and moving contact supports have a width at least equal to the width of the magnet pole which faces them, the said supports being extended beyond the contacts by horns or the like, in which the external edges are arranged so as to permit the movement of the feet of the arc parallel to the lateral faces of the magnet, de-limiting with the said faces and in co-operation with a casing isolating two lateral extinction chambers, such that in each of them the neutral line of magnetization occupies a central position which is the position of equilibrium of the arc under the action solely of the field of the magnetized mass.

The switch can be of the single or double-break type, and the angle of the horns and the contact supports can vary from 90° to 180°, depending on the current to be broken.

In the case where the current can reach high intensities and generate a large local field, a first alternative form of the invention consists of arranging a magnetized mass having its pole face located opposite the contacts, the said face having a width less than the second pole face opposite the contacts; for example, in the case of a prismatic magnet, the transverse section may be trapezoidal.

In the case where the magnet has a parallelepiped, cubic or prismatic shape, a second alternative form of the invention consists of the addition of a magnetic blow-out U, the flat bottom of which is applied against the pole of the magnet opposite to the contacts, without air-gap, the arms of the U surrounding the magnet, the blow-out horns and the part of the contact supports which carries the contacts, forming on each side of the magnet an arc-extinction chamber in which the lines of force of the magnetic field are divergent.

In another alternative form of the invention, the flat fins of non-magnetic metal perpendicular to the plane of symmetry of the contacts, are arranged in an insulating casing on each side of the fixed and moving contact supports and of the magnetized mass, in a direction substantially perpendicular to the line of opening of the contacts.

In a further alterantive form of the invention, the non-magnetic fins are mounted inside the U forming a magnetic guide and are applied against the lateral walls of this U in the same respective position.

Other characteristic features and advantages of the present invention will be brought out in the description which follows below with reference to the accompanying drawings, in which:

FIG. 1 shows in perspective view an arc blow-out device according to the invention, comprising a magnetic body arranged facing a fixed contact support and a moving contact support;

Figure 3:
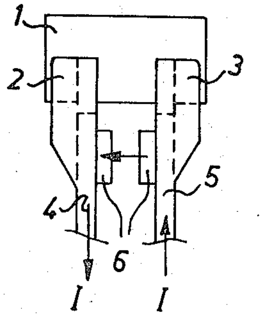
FIG. 3 shows a side view of an arc blow-out device according to the invention.
Figure 3A:
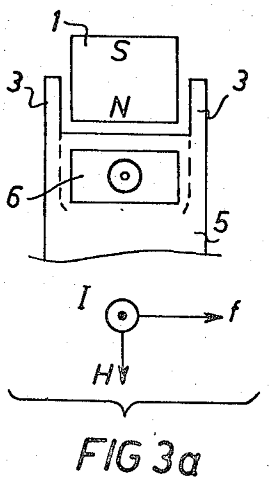
Figure 4A:
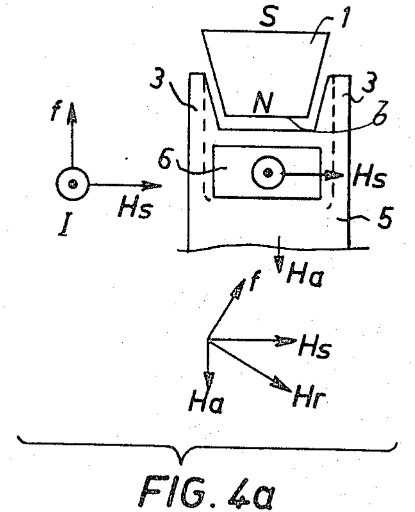
Figure 4B:
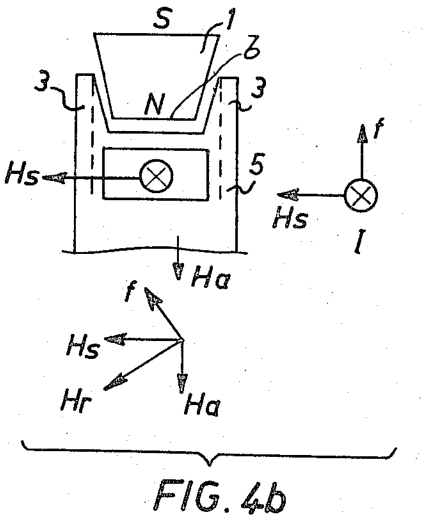
Figure 5:
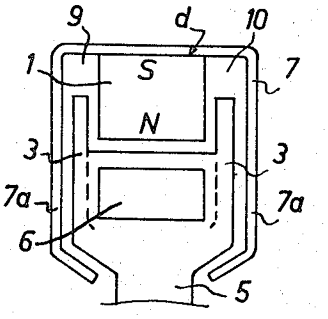

FIG. 3*a* is a partial view in plan of this same device, accompanied by a conventional vectorial diagram, field, current, force for the direction of the current indicated;

FIGS. 4*a* and 4*b* are views similar to FIG. 3*a*, accompanied by vectorial representation of conventional type, each for one direction of the current, but comprising a magnetic body of trapezoidal transverse section for the cases in which the intensity and therefore the actual field of the current are large;

FIG. 5 is a partial view in plan of a blow-out device equipped with a magnetic guide, in the case of a magnetc of rectangular or square section.

Figure 7:
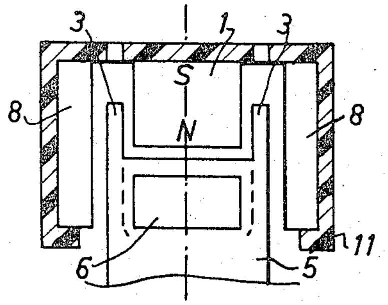
Figure 8:
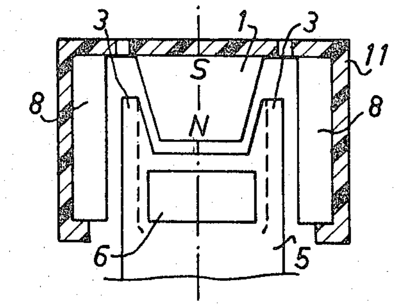
Figure 10:
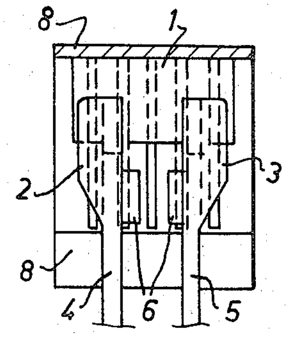
Figure 9:
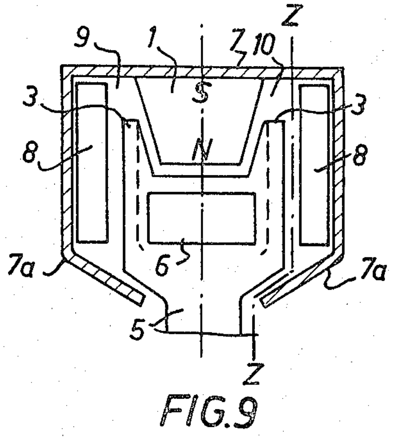

FIG. 6 is another partial view in plan of a blow-out device equipped with a magnetic guide in the case of a magnet of trapezoidal section;

FIGS. 7 and 8 are partial plan views of alternative forms of the arc blow-out device according to the invention; the said alternatives comprising non-magnetic fins arranged on each side of the contact supports and of the magnetized mass, in an insulating casing;

FIG. 9 represents a further alternative form which combines the non-magnetic fins with the magnetic guide;

FIG. 10 is a right-hand view of the device of FIG. 9, the parts located to the right of the line Z—Z being assumed to be removed;

FIG. 11 is a view in elevation of a switch with double break, provided with arc blow-out devices in accordance with the invention.

In the forms of embodiment shown, there is seen in all cases a magnetized prismatic body 1 with quadrangular faces, of which one *b* is located facing a moving contact support 4 and a fixed contact support 5.

Each of these supports carries a contact piece 6 and is terminated by horns (horns 2 for the moving support and horns 3 for the fixed support). These horns form with their support an angle which can vary between 90° and 180°. In the form of construction shown, the pole face *b* facing the contact supports is a North pole face, the magnetization of the magnetic body being effected along the direction A—A.

The plane of symmetry of the magnetized body and the plane of symmetry of the contact supports are coincident (plane X—X). This common plane of symmetry is furthermore parallel to the direction of magnetization A—A.

In accordance with this arrangement, the central plane of the magnetized body is parallel to the direction of opening and closure of the contacts B—B. This plane cuts the face *c* along the neutral line marked Y—Y.

Figure 2:
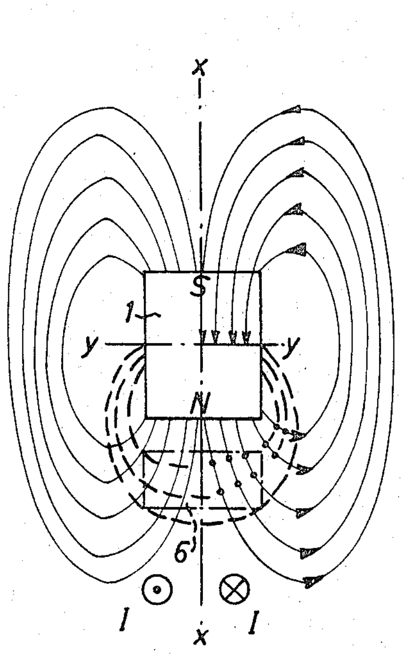
FIG. 2 is a diagram representing the lines of magnetic force of a magnetic body magnetized with two poles, together with their equi-potential contours.

The current I passing through the plane of FIG. 2 either towards the front or the rear, the breaking arc is displaced, under the action of the electro-dynamic force, either to the right or to the left along the equipotential line which passes through the contact area (see FIGS. 2, 3*e*, and 4*a*). The feet of the arc follow the path defined by the noble metal pieces 6, the fixed and moving contact supports level with the latter, together with the horns 2 and 3, after which the arc becomes immobilized at the level of the neutral line Y—Y of the magnetized body.

Irrespective of the direction of magnetization in the breaking device, and whatever the direction of the current, the arc carries out a movement *f*1 substantially parallel and transverse to the pole face *b*-facing the contacts, and then a movement *f*2, substantially parallel and transverse to the face *a* or *c* which follows after the pole face *b* and becomes fixed at the level of the central plane of the magnet, that is to say, for the face *c*, in the vicinity of the neutral line Y—Y.

By reason of the orientation of the field of the magnetized body and of the direction of the current, the arc is thus thrown back to one side or the other of this magnetized body (face *a* or face *c*). In FIG. 1, three different forms of horns have been shown on one of the contact supports (a curved horn, a horn making a right-angle with the support, and a horn forming an intermediate angle). In FIGS. 3 and 10 in particular, the horns are in the extension of their supports (180°).

In FIG. 3, as in FIGS. 5 and 7, the magnetized body has a straight rectangular section (or a square section).

In FIGS. 4*a*, 4*b*, 6, 8 and 9, the magnetized body has a trapezoidal transverse section; this shape is appropriate for breaking currents of high intensity: the magnetic field H*s* generated by the current itself can reach values equal to or greater than the field H*a* created by the magnetized body. As the direction of these two fields is substantially at right-angles, their resultant H*r* can be such that the arc, during its movement *f*, meets the pole face *b* of the magnetized body, which is a disadvantage for breaking.

A trapezoidal section prevents this immobilization of the arc at the level of the pole face *b* of the magnetized body (FIGS. 4*a*, 4*b*, 8, 9 and 10).

An alternative form of the invention consists of providing the arc blow-out device with a magnetic blow-out member 7 of U-shape, the flat face of which is applied without air-gap against the pole face *d* opposite to the pole face *b* which faces the contacts.

The arms 7*a* of the U surround the magnetized body 1, the arcing horns 2 and 3 and the contact supports.

Under these conditions, the magnetized body 1 defines itself in the blow-out casing, two different arc-extension chambers 9 and 10.

The magnetic U-shaped blow-out guide 7 reinforces the field produced by the magnetized body at the level of the contacts, while modifying the path of the lines of magnetic force in a direction favourable to blow-out.

In the alternative forms shown in FIGS. 7 and 8, magnetized bodies of rectangular or square transverse section and trapezoidal transverse section are combined with flat fins 8 of non-magnetic metal, arranged on each side of the contact supports and of the magnetized mass, in a casing of ceramic material or the like provided with small aeration openings in its bottom.

In the forms of construction shown in FIGS. 9 and 10, the blow-out device according to the invention (with a magnetized body of trapezoidal section as in FIG. 9 or of rectangular or square section) is provided at the same time with a magnetic guide 7 and non-magnetic fins 8 arranged parallel to each other and the numbers of which depend on the arc voltage which it is desired to obtain. This arrangement has the advantage of adding the effects of the magnetic guide to those of the non-magnetic fins.

In FIG. 11, there has been shown a switch with a double break and comprising two arc blow-out devices according to the invention. The magnetized bodies of these devices are fixed inside a casing 11 of insulating material, in such manner as to form the side extinction chambers 9 and 10.

The magnetic bodies of the devices according to the invention are permanent magnets with a high coercive field, so that they can withstand high de-magnetizing fields, and having low magnetic permeability. These magnets are constituted with advantage by isotropic and anisotropic metallurgical alloys or isotropic and anisotropic ceramic alloys.

In a general way, the foregoing description has only been given by way of indication and without any limitation, and the invention is capable of numerous alternative forms in accordance with its scope.

Thus, the magnetized bodies may have the form of a cylinder with a straight semi-circular section, a half-disc or a half-ring, the magnetization parallel to the plane of symmetry of the contact supports being either radial or parallel to a given direction.

We claim:

1. Non-polarized arc blow-out device for current-breaking apparatus of the type comprising two laterally placed extinction chambers and at least one magnetic mass producing a blow-out field the induction lines of which diverge transversely in relation to the direction of break of the contacts, the said blow-out device comprising:

fixed and mobile contact supports;

a magnetized mass having a plane of symmetry which is coincident with the longitudinal plane of symmetry of the fixed and mobile contact supports and the direction of magnetization of which is parallel to the said plane;

one of the poles of the magnetized mass being located opposite the fixed and mobile contacts while the fixed and mobile contact supports have a width at least equal to the width of this pole;

horns the outer edges of which are so arranged as to permit the movement of the feet of the arc parallel to the lateral faces of the magnetized mass, extending the fixed and mobile supports beyond their contacts;

and the length of the magnetized mass being at least equal to the distance between the ends of said horns when the contacts are open.

2. Arc blow-out device according to claim 1 comprising:

an insulating casing which, together with the said horns and the lateral faces of the magnetized mass, define the said two laterally placed extinction chambers and in each of which the neutral line of magnetization occupies a central position which is the position of equilibrium of the arc under the action solely of the field of the magnetized mass.

3. Arc blow-out device according to claim 1 wherein the angle between the horns and the contact supports can vary from 90° to 180°, depending on the current to be broken.

4. Arc blow-out device according to claim 1 wherein the cross-section of the magnetized mass is preferably quadrangular.

5. Arc blow-out device according to claim 1, which is particularly suitable for the breaking of high intensity currents, wherein the face of the magnitized mass situated opposite the contacts has a width less than the second pole face opposite the contacts to enable the arc to move without meeting the polar face situated opposite the contacts, this movement being perpendicular to the resultant of two fields, i.e. the field of the magnetized mass and the field produced by the current itself.

6. Arc blow-out device according to claim 1 in which the magnetized mass is a permanent magnet having a high coercive field and a low magnet permeability, preferably made of isotropic or anisotropic ceramic alloys.

7. Arc blow-out device according to claim 1 in which a magnetic guide, preferably U-shaped, may surround the magnetized mass, the blow-out horns and the contact supports.

8. Arc blow-out device according to claim 1 in which the magnetized mass may be combined with fins of non-magnetic metal arranged on both sides of the contact supports and of the magnetized mass.

9. Arc blow-out device according to claim 1 in which the blow-out device comprises both a magnetic guide and non-magnetic fins.

References Cited

UNITED STATES PATENTS

| | | | |
|---|---|---|---|
| 2,332,446 | 10/1943 | Henrich | 200—147 |
| 2,334,562 | 11/1943 | Latta | 200—147 |
| 2,506,991 | 5/1950 | Brown | 200—147 |
| 2,575,060 | 11/1951 | Matthias | 200—147 |
| 2,875,303 | 2/1959 | Immel et al. | 200—147 |

ROBERT S. MACON, *Primary Examiner.*

UNITED STATES PATENT OFFICE

CERTIFICATE OF CORRECTION

Patent No. 3,376,401 April 2, 1968

Jules Bazi et al.

It is certified that error appears in the above identified patent and that said Letters Patent are hereby corrected as shown below:

In the heading to the printed specification, line 9, "Aug. 24, 1964" should read -- Aug. 29, 1964 --.

Signed and sealed this 9th day of September 1969.

(SEAL)
Attest:

Edward M. Fletcher, Jr.
Attesting Officer

WILLIAM E. SCHUYLER, JR.
Commissioner of Patents